United States Patent [19]

Akiyama et al.

[11] Patent Number: 4,675,887
[45] Date of Patent: Jun. 23, 1987

[54] SOLID STATE IMAGING DEVICE AND METHOD WITH ROW-BY-ROW CHARGE TRANSFER

[75] Inventors: Toshiyuki Akiyama, Kodaira; Norio Koike, Tokyo; Kenji Ito, Katsuta; Takeshi Ogino, Kokubunji; Shuusaku Nagahara, Hachioji, all of Japan

[73] Assignee: Hitachi, Ltd., Tokyo, Japan

[21] Appl. No.: 736,259

[22] Filed: May 21, 1985

[30] Foreign Application Priority Data

May 23, 1984 [JP] Japan ................. 59-102528

[51] Int. Cl.$^4$ ............ G11C 19/28; H01L 29/78; H01L 27/14; H01L 31/00
[52] U.S. Cl. ..................... 377/58; 377/62; 357/24; 357/30
[58] Field of Search ............ 357/24, 30; 377/57–63

[56] References Cited

U.S. PATENT DOCUMENTS

| | | | |
|---|---|---|---|
| 3,856,989 | 12/1974 | Weimer | 357/24 LR |
| 4,178,614 | 12/1979 | Sauer | 357/24 LR |
| 4,472,741 | 9/1984 | Takatsu et al. | 357/24 LR |
| 4,489,423 | 12/1984 | Suzuki | 357/24 LR |

FOREIGN PATENT DOCUMENTS 58-210663 12/1983 Japan .
59-31056 2/1984 Japan .
59-68970 4/1984 Japan .

*Primary Examiner*—Gene M. Munson
*Attorney, Agent, or Firm*—Antonelli, Terry & Wands

[57] ABSTRACT

A solid stage imaging device, in which photodiodes each capable of converting incident light into a electric charge and accumulating the electric charge are arranged regularly in a matrix, e.g. in horizontal and vertical directions, and electric charges of the photodiodes are sent to the outside by means of CCD's, includes a scanning circuit which scans switching MOS transistors for transferring the electric charges of the photodiodes to vertical CCD's, in a vertical direction so that switching MOS transistors in a row parallel to a horizontal direction can be driven independently of switching MOS transistors in another row. When the solid state imaging device is driven, an operation for transferring an electric charge in each vertical CCD and an operation for driving switching MOS transistors in the next row with the aid of the scanning circuit are alternately performed, to reduce the amount of smear and to increase the dynamic range of each vertical CCD, without increasing the number of CCD's used.

9 Claims, 17 Drawing Figures

SOLID STATE IMAGING DEVICE AND METHOD WITH ROW-BY-ROW CHARGE TRANSFER

BACKGROUND OF THE INVENTION

1. Field of the Invention

The present invention relates to a solid state imaging device including a photoelectric conversion element group made up of a large number of photodiodes, each of which converts incident light into an electric charge and accumulates the electric charge, and a charge transfer device connected to the photoelectric conversion element group. Further, the present invention relates to a method of driving the above solid state imaging device.

2. Description of the Prior Art

FIG. 1 shows an example of a solid state imaging device of the interline transfer type which includes a charge coupled device (hereinafter simply referred to as "CCD") and a photoelectric conversion element group made up of photodiodes. In FIG. 1, reference numeral 400 designates a light receiving part, 600 photoelectric conversion elements (that is, photodiodes) each capable of converting incident light into an electric charge and accumulating the electric charge, 101 to 10N vertical charge transfer means (that is, vertical CCD's) for transferring the electric charges accumulated in the photoelectric conversion elements, in vertical directions indicated by arrows, 201 a terminal applied with a transfer pulse signal $\phi_{V1}$, and 202 a terminal applied with another transfer pulse signal $\phi_{V2}$. The transfer pulse signals $\phi_{V1}$ and $\phi_{V2}$ are synchronized with the horizontal synchronizing signal of television signal.

A signal charge accumulated in a photoelectric conversion element 600 is transferred to one of the vertical CCD's 101 to 10N which is adjacent to the photoelectric conversion element, in a vertical retrace period by a switching pulse signal $\phi_{V0}$ applied to a terminal 204. After having been transferred, the signal charge is transferred upwardly in the above one of the vertical CCD's 101 to 10N by the pulse signals $\phi_{V1}$ and $\phi_{V2}$.

Further, reference numeral 300 designates a horizontal charge transfer means (that is, a horizontal CCD) for transferring an electric charge in a horizontal direction by a horizontal pulse signal $\phi_H$ applied to a terminal 203. Signal charges which have been transferred from the vertical CCD's 101 to 10N to the horizontal CCD 300, are delivered, as a video signal, to the outside through an amplifier 500 and an output terminal 205, in one horizontal period.

In the imaging device of FIG. 1, a signal charge accumulated in a photoelectric conversion element 600 is transferred to one of the vertical CCD's 101 to 10N which is adjacent to the photoelectric conversion element, on the basis of the saturation characteristics of a switching MOS transistor 206 which is formed of an MOS field effect transistor, connected between the photoelectric convertion element and the above vertical CCD, and driven by the switching pulse signal $\phi_{V0}$.

FIG. 2 shows the structure of the vertical CCD 10N of FIG. 1, viewed in the direction of the thickness thereof, accompanied with an equivalent circuit diagram. In FIG. 2, reference numeral 110 designates a semiconductor substrate, 111 gate electrodes formed of a first polysilicon layer, 112 gate electrodes formed of a second polysilicon layer, 113 a schematic potential level formed under the gate electrodes 111 and 112, and 114 a signal charge to be transferred by the potential level.

Each of the vertical CCD's 101 to 10N shown in FIG. 1 is driven by the two pulse signals $\phi_{V1}$ and $\phi_{V2}$ which are different in phase from each other, as shown in FIG. 2. Accordingly, it is required to operate each vertical CCD so that a stage 116 or 118 having no signal charge exists between two stages each having a signal charge. (In recent years, vertical CCDs are often driven by four pulse signals which are different in phase from each other. In this case, it is also required to drive the vertical CCD in such a manner that a stage having no signal charge exists between two stages each having a signal charge as in the driving method of FIG. 2.)

The signal charges accumulated in the photoelectric conversion elements 600 are transferred to the first to M-th stages of each of the vertical CCD's 101 to 10N by the switching pulse signal $\phi_{V0}$. In the first field of television signal, however, signal charges from the photoelectric conversion elements in the first and second rows are collected in the first stages of the vertical CCD's 101 to 10N, and signal charges from the photoelectric conversion elements in the third and fourth rows are collected in the third stages of the vertical CCD's 101 to 10N. That is, signal charges from all the photoelectric conversion elements 600 in the light receiving part 400 are collected in odd-numbered stages of the vertical CCD's 101 to 10N, and even-numbered stages of the vertical CCD's 101 to 10N have no signal charge. The odd-numbered stages and even-numbered stages of a vertical CCD are used for transferring signal charges therein. In the horizontal retrace period of television signal, signal charges in a vertical CCD are transferred by two stages, and the sum of signal charges from two photoelectric conversion elements in adjacent rows, for example, in the first and second rows is transferred to the horizontal CCD 300, to be read out from the output terminal 205 in the horizontal effective scanning period which follows the above horizontal retrace period. Similarly, the sum of signal charges from two photoelectric conversion elements in the third and fourth rows, the sum of signal charges from two photoelectric conversion elements in the fifth and sixth rows, and so on are successively read out at intervals of one horizontal period.

While, in the second field, the sum of signal charges from two photoelectric conversion elements in the second and third rows, the sum of signal charges from two photoelectric conversion elements in the fourth and fifth rows, and so on are successively read out at intervals of one horizontal period, to carry out an interlaced scanning.

In the imaging device of FIG. 1, however, part of an electric charge which is generated beneath a photodiode 600 by incident light, may leak in a vertical CCD in a period when signal charges are transferred in the vertical CCD, and thus a smear may appear on a display screen in the form of a vertical, white belt. Further, the sum of signal charges from a pair of photodiodes in adjacent rows is always read out, that is, it is impossible to read out signal charges from all the photodiodes in the light receiving part 400 independently of each other. Accordingly, when a single chip color imaging device is formed of the device of FIG. 1, the resolution of the color imaging device is reduced, and a Moiré pattern appears on a display screen. Hence, it is required to read out signal charges from all the photodiodes independently of each other at every field. In an improved imaging device capable of reducing the above-mentioned smear, a charge storage part for storing signal charges corresponding to one field of television signal (that is, $(M \times N)/2$ signal charges) is provided between the light receiving part 400 and horizontal CCD 300 (where M indicates the number of rows in which the photodiodes are arranged, and N the number of photodiodes in one row). In this device, signal charges of all the photodiodes are transferred to the charge storage part in the horizontal retrace period, which is a very short period. (It is to be noted that, in the device of FIG. 1, signal charges of all the photodiodes are taken out from light receiving part 400 in a period corresponding to one field.) Accordingly, in the improved device, a period during which a signal charge stays in a vertical CCD is short, and hence the amount of smear charge which leaks in the vertical CCD, decreases. That is, a smear appearing on the display screen is reduced. However, the improved device includes the charge storage part, and therefore has a drawback that the area of the imaging chip is large.

In other conventional imaging devices capable of reading out signal charges of two photodiodes in adjacent rows independently of each other, the number of stages included in each vertical CCD is made twice as large as the number of rows in which photodiodes are arranged. Alternatively, as shown in FIG. 3, one vertical CCD of FIG. 1 is divided into two vertical CCD's, and signal charges from a pair of photodiodes in adjacent rows are transferred to one and the other of the two vertical CCD's, to be transferred independently of each other. The imaging device of FIG. 3 is disclosed in a Japanese utility model application specification (Laid-open No. sho 58-56458). In these imaging devices, however, fine patterning is required for fabricating an imaging chip, and a ratio of the light receiving area of each picture element to the whole surface area thereof is decreased, that is, the light sensitivity of the picture element may be reduced. Further, there arises a problem that the dynamic range of each vertical CCD may be reduced. Additionally, owing to the fine patterning, a region necessary for isolating a picture element from a vertical CCD is made narrow, and hence the amount of smear charge which leaks in the vertical CCD may be increased. Thus, a smear on the display screen may also be increased.

SUMMARY OF THE INVENTION

An object of the present invention is to provide a solid state imaging device which can overcome the drawbacks of conventional solid state imaging devices and can reduce the amount of smear, read out signals of all picture elements independently of each other, and increase the dynamic range of a vertical CCD, without providing a charge storage part or increasing the number of vertical CCD's or the number of stages included in each vertical CCD. It is also an object to provide a method of driving the above solid state imaging device.

In order to attain the above and other objects, in a solid state imaging device and a driving method according to the present invention, switching transistors (each formed of an MOS field effect transistor) for transferring signal charges from photodiodes to vertical CCD's are controlled by scanning means (for example, a shift register) so that switching transistors in a horizontal row are driven independently of switching transistors in another horizontal row, and signal charges are transferred in the vertical CCD's by at least one stage in a period between a time switching transistors in a horizontal row are put in an ON-state and a time switching transistors in the next horizontal row are put in the ON-state.

According to the above-mentioned operation of the present invention, the amount of smear is reduced, a signal charge can be read out independently of a smear charge, or the dynamic range of each vertical CCD is increased, without necessitating a charge storage part or increasing the number of vertical CCD's or the number of stages included in each vertical CCD.

DESCRIPTION OF THE PREFERRED EMBODIMENTS

Figure 4:
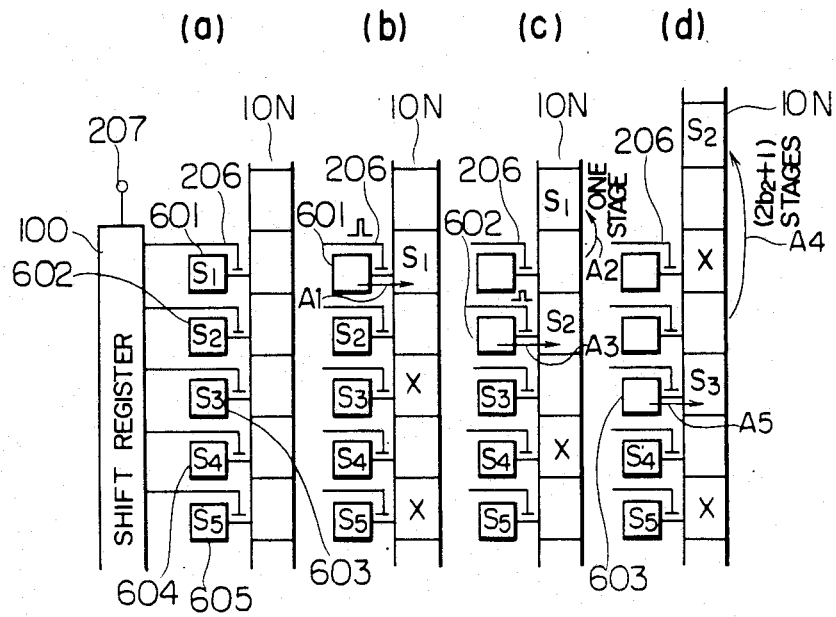
FIG. 4 is a schematic diagram for explaining an embodiment of a solid-state-imaging-device driving method according to the present invention.

The principle of the present invention will first be explained, with reference to FIG. 4 which schematically shows the transfer of signal charges in one vertical CCD. Part (a) of FIG. 4 shows that signal charges $S_1$ to $S_5$ are accumulated in photodiodes 601 to 605, respectively. Referring to FIG. 4, a signal read-out operation in the first field, that is, a read operation for reading out signal charges of the photodiodes 601 and 602 in the first and second rows, signal charges of the photodiodes 603 and 604 in the third and fourth rows, and so on at intervals of one horizontal period, is performed in accordance with the following procedure. At first, an input pulse is applied to an input terminal 207 of a shift register 100, to put a switching MOS transistor 206 which is connected to the photodiode 601 in the first row, in an ON-state, thereby transferring the signal charge $S_1$ of the photodiode 601 to a vertical CCD 10N as indicated by an arrow A1 in part (b) of FIG. 4. Incidentally, reference mark X indicates a stage which can hold a signal charge but has no signal charge. Thereafter, the signal charge $S_1$ is transferred upwardly in the vertical CCD 10N by one stage, as indicated by an arrow A2 in part (c) of FIG. 4. Then, the shift register 100 is advanced by one stage, and the signal charge $S_2$ of the photodiode 602 in the second row is transferred to the vertical CCD 10N as indicated by an arrow A3 in part (c) of FIG. 4. Thus, a stage having no signal charge is interposed between a stage having the signal charge $S_1$ and a stage having the signal charge $S_2$. Accordingly, the signal charges $S_1$ and $S_2$ can be transferred in the vertical CCD 10N without being mixed with each other. Further, after the signal charge $S_2$ has been transferred upwardly in the vertical CCD 10N by $(2b_2+1)$ stages (where $b_2$ indicates the number of stages which can hold a signal charge but have no signal charge, that is, are indicated by the mark X) as indicated by an arrow A4 in part (d) of FIG. 4, the signal charge $S_3$ of the photodiode 603 in the third row is transferred to the vertical CCD 10N as indicated by an arrow A5. It is to be noted that the symbol $b_2$ is an integer satisfying a relation $b_2 \leqq 0$ and is made equal to 1 (one) in part (d) of FIG. 4. After signal charge $S_3$ has been transferred upwardly in the vertical CCD 10N by one stage, the signal charge $S_4$ of the photodiode 604 in the fourth row is transferred to the vertical CCD 10N. Then, the signal charge $S_4$ is transferred upwardly in the vertical CCD 10N by $(2b_2+1)$ stages. That is, signal charges of a pair of photodiodes in adjacent rows are transferred to the vertical CCD 10N at intervals of a period required for transferring an electric charge by $2b_2+2$ stages of vertical CCD.

Signal charges which are transferred from photodiodes to the vertical CCD 10N in accordance with the above procedure, are transferred upwardly in the vertical CCD, so that the signal charges $S_1$ and $S_2$ of the photodiodes in the first and second rows, the signal charges $S_3$ and $S_4$ of the photodiodes in the third and fourth rows, the signal charges of photodiodes in the fifth and sixth rows, and so on are read out at intervals of one horizontal period. In other words, a signal charge in the vertical CCD passes through $2(b_2+2)$ stages in one horizontal period, to transfer a pair of signal charges from photodiodes to the vertical CCD 10N and read out only signal charges from the vertical CCD 10N in one horizontal period.

The transfer of signal charge according to the present invention have three advantages, a first one of which resides in that the signal charges of the photodiodes 601, 602, ..., and so on can be transferred in and taken out from the vertical CCD 10N independently from each other. The second advantage is to increase the dynamic range of the vertical CCD 10N. In contrast to the conventional device of FIG. 1 in which the signal charges of two photodiodes, for example, the signal charges $S_1$ and $S_2$ are put together and the sum of them is transferred in the vertical CCD, according to the present invention, the signal charges of the photodiodes are separated from each other and transferred in the vertical CCD independently of each other. Hence, the maximum amount of signal charge transferred in the vertical CCD, that is, the dynamic range of the vertical CCD is about twice as large as the dynamic range of the vertical CCD included in the conventional device of FIG. 1. The third advantage is to reduce the amount of smear. In the conventional device of FIG. 1, the sum of signal charges from a pair of photodiodes in adjacent rows is transferred in a vertical CCD by two stages in one horizontal period. While, according to the present invention, a signal charge in the vertical CCD passes through $2(2+b_2)$ stages in one horizontal period. That is, transfer velocity of signal charge according to the present invention is $(2+b_2)$ times as large as the transfer velocity of signal charge in the conventional device. Accordingly, a period during which a smear charge leaks in the vertical CCD and is accumulated therein, is short, and hence the amount of smear can be reduced.

Figure 1:
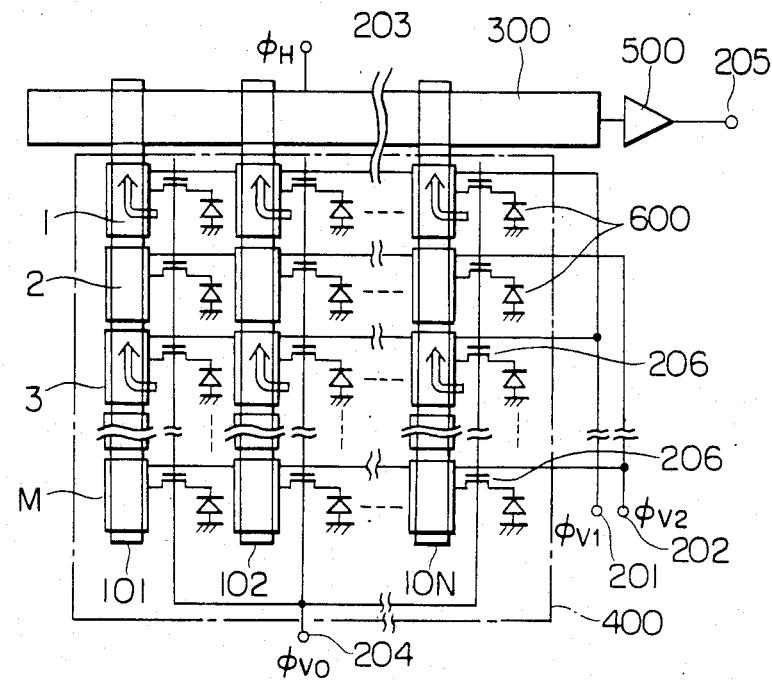
FIG. 1 is a schematic diagram showing a conventional solid state imaging device.
Figure 2:
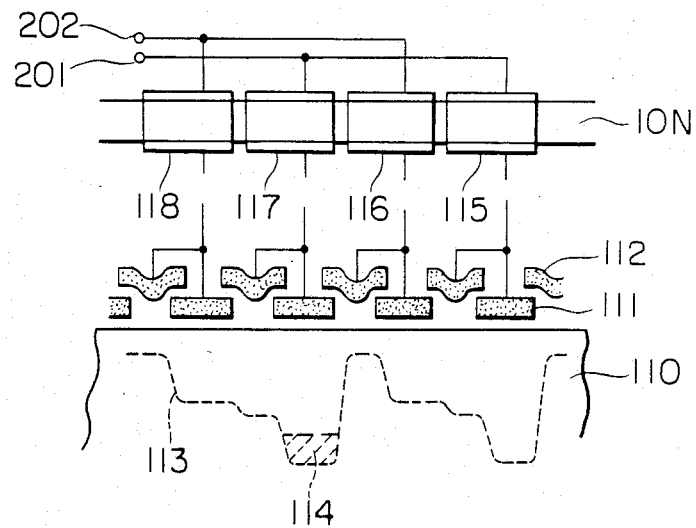
FIG. 2 is a diagram, partly cross-sectional and partly schematic of the vertical CCD 10N shown in FIG. 1.
Figure 3:
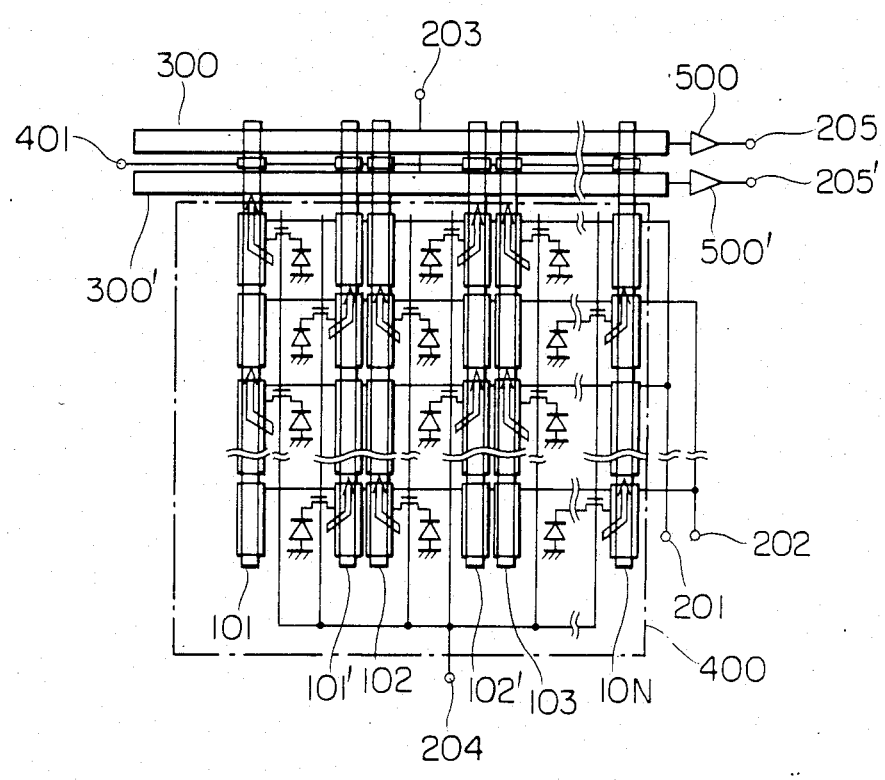
FIG. 3 is a schematic diagram showing another conventional solid state imaging device.

In the above, explanation has been made on a case where signal charges are transferred upwardly in the vertical CCD as in the device of FIG. 1. However, it is also possible to transfer signal charges downwardly in the vertical CCD and to read out the signal charges therefrom.

Figure 5:
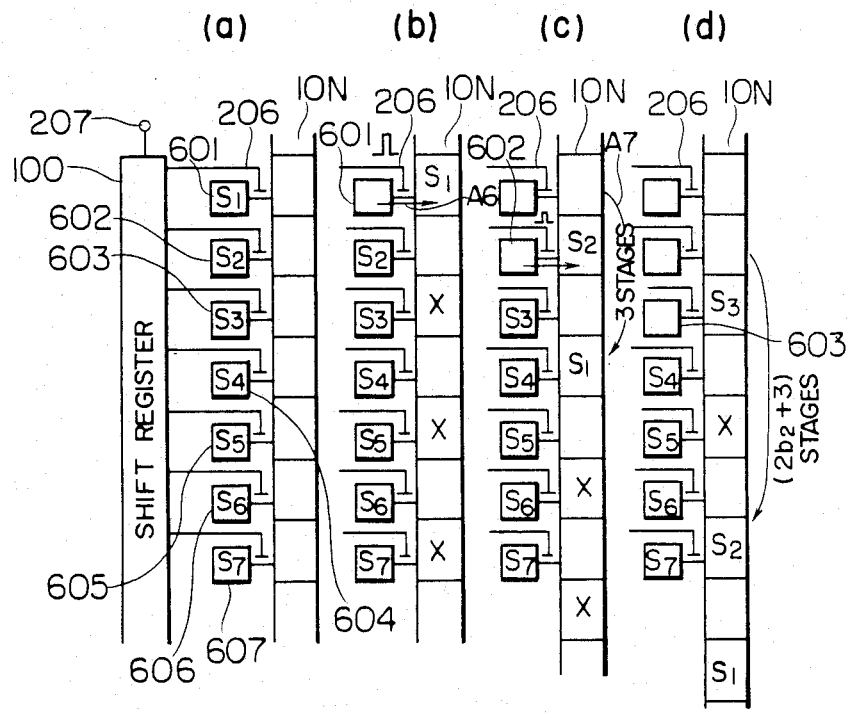
FIGS. 5 and 6 are schematic diagrams for explaining other embodiments of a solid-state-imaging-device driving method according to the present invention.

FIG. 5 schematically shows such a signal charge read-out method. Parts (a) to (d) of FIG. 5 correspond to parts (a) to (d) of FIG. 4, respectively. The method of FIG. 5 is opposite in transfer direction of signal charge to that of FIG. 4, and hence is different from the method of FIG. 4 in the procedure for taking out signal charges from photodiodes and in a time when the input pulse is applied to the input terminal 207 of the shift register 100. In the method of FIG. 5, the transfer and propagation of signal charge are carried out in the following manner. The signal charge $S_1$ of the photodiode 601 is transferred to the vertical CCD 10N as indicated by an arrow A6 in part (b) of FIG. 5, and then propagated downwardly in the vertical CCD 10N by three stages as indicated by an arrow A7 in part (c) of FIG. 5. The shift register 100 is advanced by one stage, and the signal charge $S_2$ of the photodiode 602 is transferred to the vertical CCD 10N. Thereafter, the signal charges $S_1$ and $S_2$ are transferred downwardly in the vertical CCD 10N by $(2b_2+3)$ stages (where the symbol $b_2$ indicates the number of stages designated by reference mark X and is an integer satisfying a relation $b_2 \geqq 0$), and then the signal charge $S_3$ of the photodiode 603 is transferred to the vertical CCD 10N, as shown in part (d) of FIG. 5. Incidentally, the integer $b_2$ is made equal to 1 (one) in part (d) of FIG. 5. Thereafter, the signal charges $S_1$ to $S_3$ are transferred downwardly in the vertical CCD 10N by three stages. Then, after the signal charge $S_4$ has been transferred to the vertical CCD 10N, the signal charges $S_1$ to $S_4$ are transferred downwardly in the vertical CCD 10N by $(2b_2+3)$ stages. Such an operation is repeated. According to the above procedure, the arrangement of the signal charges $S_1$, $S_2$, ... and so on in the vertical CCD 10N is the same as obtained by turning upside down the arrangement of signal charges in the method of FIG. 4. Accordingly, when the vertical CCD 10N is driven so that signal charges therein pass through $2(2+b_2)$ stages in one horizontal period, signal charges from a pair of photodiodes in adjacent rows are read out from the vertical CCD 10N at intervals of one horizontal period. In the method of FIG. 5, however, even if the signal charge $S_1$ for the second field is transferred from the photodiode 601 to the vertical CCD 10N by applying the input pulse to the shift register 100 after a signal charge $S_M$ of a photodiode 60M in the bottom row has been read out from the vertical CCD 10N, the signal charge $S_1$ will be read out from the vertical CCD 10N after a time which is $M/\{2 \times (2+b_2)\}$ times longer than one period, has elapsed. Accordingly, when the vertical retrace period of television signal is made $N_V$ times longer than one horiozntal period, it is required to transfer the signal charge $S_1$ of the second field to the vertical CCD 10N so that the signal charge $S_M$ of the first field is transferred to the vertical CCD 10N when a time which is $$\left\{ \frac{M}{2\times(2+b_2)} - N_1 \right\}$$

times as long as one horizontal period, has elapsed after the signal charge $S_1$ of the second field was transferred to the vertical CCD 10N. In the method of FIG. 5, signal charges are transferred in the vertical CCD in the same manner as in the method of FIG. 4. Accordingly, the method of FIG. 5 can produce the same effect as obtained by the method of FIG. 4.

When a relation $b_2 \geqq 1$ is satisfied in the methods of FIGS. 4 and 5, a stage designated by the mark X contains only a smear charge. When a signal resulting from the smear charge is subtracted from a signal resulting from the sum of a signal charge and a smear charge by circuit means, the amount of smear appearing on a display screen can be greatly reduced.

Further, if the signal charge of one photodiode (for example, the signal charge $S_1$) is distributed between two or more stages of the vertical CCD 10N, the dynamic range thereof will be greatly increased as compared with the methods of FIGS. 4 and 5.

Further, in a solid state imaging device according to the present invention, the sum of signal charges from a pair of photodiodes in adjacent rows can be transferred in a vertical CCD as in the conventional device of FIG. 1. In this case, the amount of smear can be made smaller as compared with the conventional device, by interposing one or more stages which are designated by the mark X, between two stages each having a signal charge.

Figure 6:
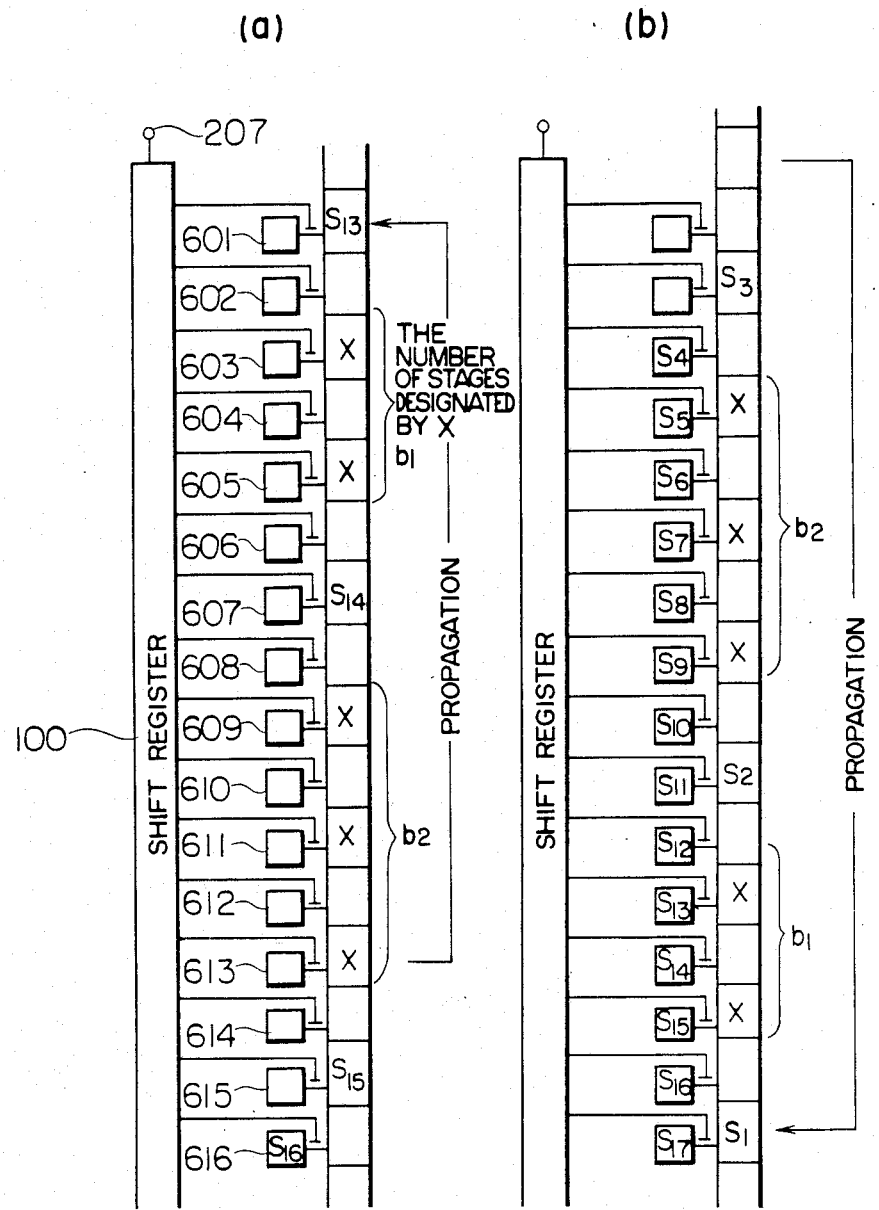

In FIGS. 4 and 5, the number of stages which can hold a signal charge but have no signal charge, that is, are designated by the mark X, and moreover are interposed between two stages each having a signal charge, is made equal to $b_2$ for the sake of simplicity. However, the present invention is not limited to such a case, but the number of stages which are designated by the mark X and interposed between two stages each having a signal charge can be varied as shown in parts (a) and (b) of FIG. 6. Part (a) of FIG. 6 shows a case where the number of stages which are designated by the mark X and interposed between a stage having a signal charge $S_{13}$ from a photodiode 613 in an odd-numbered row and a stage having a signal charge $S_{14}$ from a photodiode 614 in an even-numbered row, is $b_1$, and the number of stages which are designated by the mark X and interposed between the stage having the signal charge $S_{14}$ and a stage having a signal charge $S_{15}$ from a photodiode 615 in an odd-numbered row is $b_2$. Similarly, in the method of part (b) of FIG. 6, the number of stages which are designated by the mark X and interposed between a stage having the signal charge from the photodiode 601 in the first row (that is, an odd-numbered row) and a stage having the signal charge $S_2$ from the photodiode 602 in the second row (that is, an even-numbered row), is $b_1$, and the number of stages which are designated by the mark X and interposed between the stage having the signal charge $S_2$ and a stage having the signal charge $S_3$ from the photodiode 603 in the third row (that is, an odd-numbered row) is $b_2$. The methods shown in parts (a) and (b) of FIG. 6 can produce the same effect as obtained by the methods shown in FIGS. 4 and 5. However, in the method of part (a) of FIG. 6, signal charges of a pair of photodiodes in adjacent rows are transferred to the vertical CCD at intervals of a period required for transferring a signal charge by $\{(2b_1+1)+(2b_2+1)\}$ stages. While, in the method of part (b) of FIG. 6, signal charges of a pair of photodiodes in adjacent rows are transferred to the vertical CCD at intervals of a period required for transferring a signal charge by $\{(2b_1+3)+(2b_2+3)\}$ stages. Further, in both of the methods shown in parts (a) and (b) of FIG. 6, signal charges in the vertical CCD are transferred by $2\times\{(b_1+1)+(b_2+1)\}$ stages in a period, at intervals of which signal charges of a pair of photodiodes in adjacent rows are read out from the vertical CCD. That is, an electric charge in the vertical CCD is transferred at high speed, and hence the amount of smear is reduced. It is to be noted that the methods of FIGS. 4 and 5 are those examples of the methods shown in parts (a) and (b) of FIG. 6 which are obtained by making the numerical value $b_2$ equal to zero.

In the foregoing explanation, the number of stages included in a vertical CCD has been made equal to the number of photodiodes arranged in a vertical direction. However, the number of stages included in the vertical CCD may be made larger than (for example, twice as large as) the number of photodiodes in the vertical direction, or may be smaller than the number of photodiodes in the vertical direction (for example, may be made equal to one-half the number of photodiodes in the vertical direction). Further, in the foregoing, explanation has been made on a case where a vertical CCD is driven by two pulse signals which are different in phase from each other. The present invention is also applicable to a case where the vertical CCD is driven by three or four pulse signals which are different in phase from each other. Further, a CCD used in the present invention may be replaced by a charge transfer device such as a bucket brigade device.

Although a case where a two-dimensional solid state imaging device is driven in accordance with the television system, has been expained in the foregoing, it is needless to say that the present invention is also applicable to a one-dimensional solid state imaging device and a signal processing element using a CCD. In these cases, signal charges of photodiodes may be transferred to a CCD in a desired order (for example, the signal charge of the second photodiode, the signal charge of the first photodiode, the signal charge of the fourth photodiode, the signal charge of the third photodiode, and so on may be transferred in this order), or the number of stages which have no signal charge and are interposed between stages each having a signal charge, may be varied each time a signal charge is transferred to the CCD, that is, signal charges of photodiodes may be irregularly transferred to the CCD.

Figure 7A:
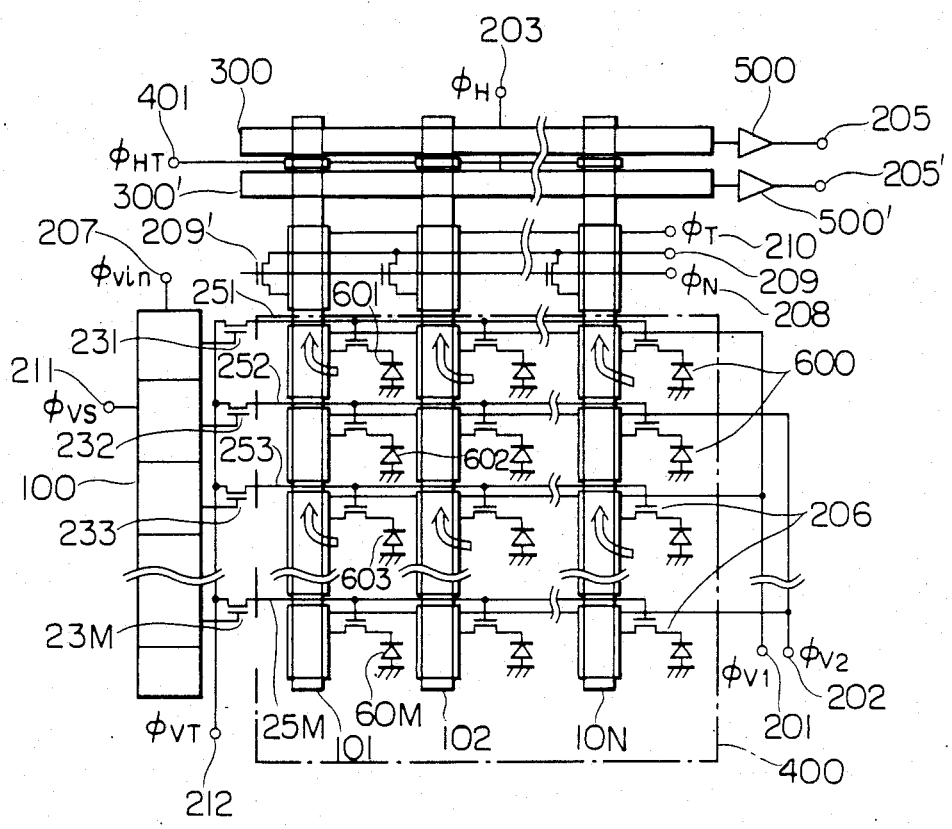
FIG. 7A is a schematic diagram showing an embodiment of a solid state imaging device according to the present invention.
Figure 7B:
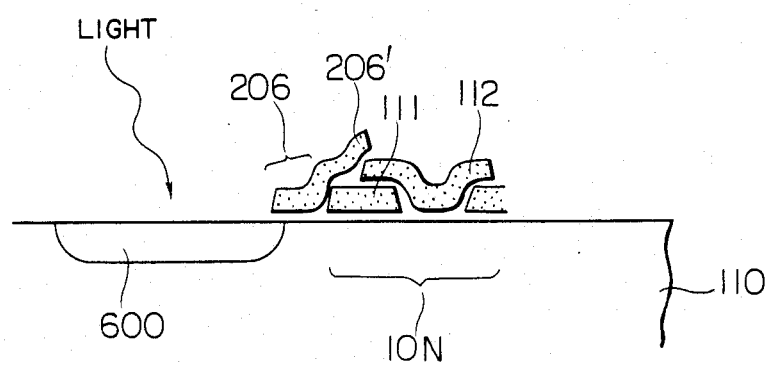
FIG. 7B is a fragmentary sectional view of the embodiment shown in FIG. 7A.

FIG. 7A shows an embodiment of a solid state imaging device of the interline transfer type according to the present invention, and FIG. 7B schematically shows the cross section of a unit structure which includes one photodiode 600 of FIG. 7A, a switching MOS transistor 206 connected to this photodiode, and part of a vertical CCD 10N connected to the switching MOS transistor 206, taken in the direction of thickness of the light receiving part 400. The embodiment of FIG. 7A is different from the conventional device of FIG. 1 in the following points. Firstly, the present embodiment has a coupling part which includes a terminal 209 for removing smear charges, a terminal 208 for applying a pulse signal $\phi_N$ to a switching MOS transistor group which is used for controlling a time when the smear charges are removed, and a terminal 210 for applying a pulse signal $\phi_T$ to respective gates of stages which temporarily store smear charges. Secondly, the present embodiment includes horizontal signal lines 251 to 25M for controlling the switching transistors 206 each formed of an MOS field effect transistor, a vertical shift register 100 for turning on switching MOS transistors 206 in a row independently of switching MOS transistors in another row, and a terminal 212 applied with a control pulse signal $\phi_{VT}$ which controls the switching MOS transistors 206. The vertical shift register 100 is driven by a drive pulse signal $\phi_{VS}$ applied to a terminal 211, and an input pulse signal $\phi_{Vin}$ is applied to a terminal 207 at every field. Referring to FIG. 7B, a wiring conductor 206' is used for connecting the switching MOS transistor 206 to the horizontal signal line 251, and one of the gate electrodes 111 and 112 for forming the vertical CCD 10N is disposed nearer to the semiconductor substrate 110 than the other gate electrode. The wiring conductor 206' is inevitably extended over the vertical CCD, and therefore is required to be formed in a layer which exists above the gate electrodes 111 and 112. (In a case where the gate of the switching MOS transistor 206 and the wiring conductor 206' are formed from the same conductive layer, it is required to form the conductive layer above the gate electrodes 111 and 112.)

Figure 8:
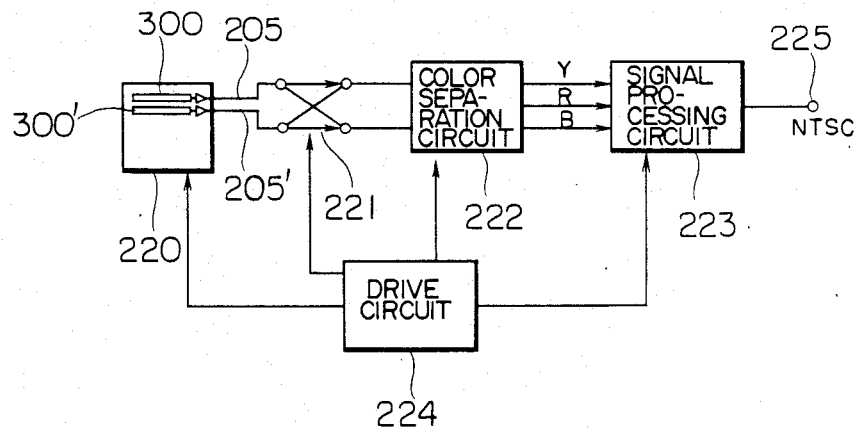
FIG. 8 is a block diagram showing an example of a signal processing circuit used in the embodiment of FIG. 7A.
Figure 9:
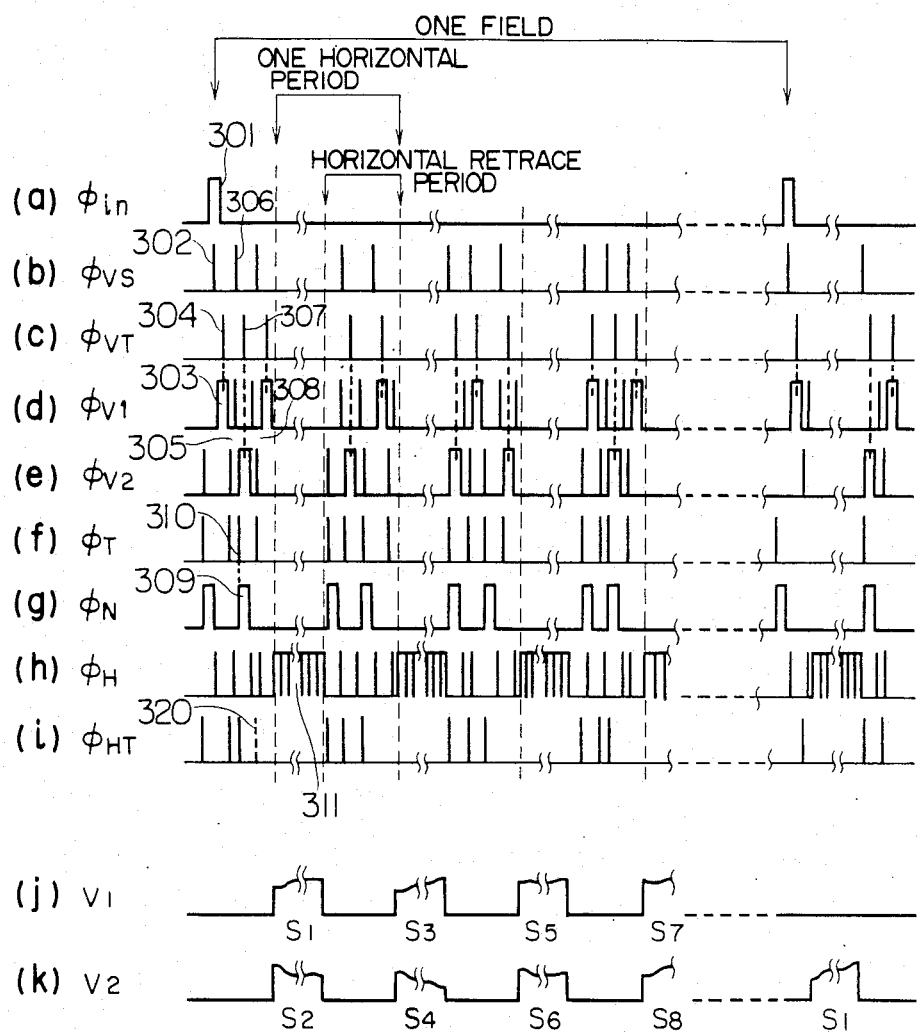
FIG. 9 is a time chart for explaining a method of driving the embodiment of FIG. 7A.

FIGS. 8 and 9 show an example of a signal processing circuit used in a case where a single chip color imaging device is formed of the device of FIG. 7A and an example of a method of driving the device of FIG. 7A in the above case, respectively. In FIG. 8, reference numeral 220 designates a single chip color imaging device, 222 a color separation circuit, 223 a signal processing circuit for processing color signals to output an NTSC signal from a terminal 225, 221 a switching circuit for connecting the color separation circuit 222 alternately to terminals 205 and 205' each time one field is started, and 224 a drive circuit which generates a pulse for driving the switching circuit 221.

FIG. 9 shows a driving method for a case where the numerical values $b_1$ and $b_2$ are both made equal to 1 (one) in part (a) of FIG. 6. Referring to FIG. 9, a pulse 301 of the input pulse signal $\phi_{Vin}$ and a pulse 302 of the drive pulse signal $\phi_{VS}$ are simultaneously applied to the terminals 207 and 211, respectively, to put a switching MOS transistor 231 which specifies the first row, in an ON-state. While, a pulse 303 of the transfer pulse signal $\phi_{V1}$ is applied to the terminal 201 and simultaneously the transfer pulse signal $\phi_{V2}$ applied to the terminal 202 is put to a low level, to put odd-numbered stages of each of the vertical CCD's 101 to 10N in a state capable of holding an electric charge. At this time, a pulse 304 of the control pulse signal $\phi_{VT}$ is applied to the terminal 212, to transfer the signal charges $S_1$ of the photodiodes in the first row to the first stages of the vertical CCD's 101 to 10N through the switching MOS transistors 206. This state corresponds to part (b) of FIG. 4. Next, the signal charges $S_1$ are transferred upwardly in the vertical CCD's by three stages (namely, $(2b_1+1)$ stages), by three pulses 305 of the pulse signals $\phi_{V1}$ and $\phi_{V2}$. Thus, the pulse signals $\phi_{V1}$ and $\phi_{V2}$ are kept at low and high levels, respectively, and hence even-numbered stage of each vertical CCD are put in the state capable of holding an electric charge. At this time, a pulse 306 of the drive pulse signal $\phi_{VS}$ is applied to the terminal 211, to advance the vertical shift register 100 by one stage, thereby putting a switching MOS transistor 232 in the ON-state. Then, a pulse 307 of the control pulse signal $\phi_{VT}$ is applied to the terminal 212, to transfer the signal charges $S_2$ of the photodiodes in the second row to the second stages of the vertical CCD's 101 to 10N. This state corresponds to part (c) of FIG. 4, excepting that one stage designated by the reference mark X is interposed between a stage having the signal charge $S_1$ and a stage having the signal charge $S_2$. Then, the signal charges $S_2$ are transferred upwardly in the vertical CCD's by three stages (namely, $(2b_2+1)$ stages), by three pulses 308 of the pulse signals $\phi_{V1}$ and $\phi_{V2}$. Thereafter, the signal charges $S_3$ of the photodiodes in the third row, the signal charges $S_4$ of the photodiodes in the fourth row, and so on are transferred to the vertical CCD's 101 to 10N in the same manner as mentioned above.

When the three pulses 305 of the pulse signals $\phi_{V1}$ and $\phi_{V2}$ are applied to the vertical CCD's, the same pulses as the two pulse of the pulse signal $\phi_{V2}$ are applied, as pulse signals $\phi_T$ and $\phi_{HT}$, the terminals 210 and 401, and the same pulse as the pulse of the pulse signal $\phi_{V1}$ is applied as a pulse signal $\phi_H$, to the terminal 203. Thus, after having been transferred by three stages, the signal charges $S_1$ are placed under gates which are connected to the terminal 401. At this time, regions which are designated by the reference mark X and have only a smear charge, are placed under gates which are connected to the terminal 210. If a pulse 309 of the pulse signal $\phi_N$ is applied to the terminal 208 and the pulse signal $\phi_T$ applied to the terminal 210 is put to a low level, smear charges under the gates which are connected to the terminal 210 will be sent to the outside through the terminal 209. Further, when the pulses 308 of the pulse signals $\phi_{V1}$ and $\phi_{V2}$ are applied to the vertical CCD's 101 to 10N, a pulse having the same timing as the pulse 308 of the pulse signal $\phi_{V2}$ is applied, as the pulse signal $\phi_T$, to the terminal 210 and two pulses having the same timing as the pulses 308 of the pulse signal $\phi_{V1}$ are applied, as the pulse signal $\phi_H$, to the terminal 203, to transfer signal charges by three stages. Incidentally, the pulse signal $\phi_{HT}$ does not contain a pulse 320 which has the same timing as the pulse 308 of the pulse signal $\phi_{V2}$. Thus, the signal charges $S_1$ are left in the horizontal CCD 300, and the signal charges $S_2$ are transferred to a horizontal CCD 300'. As mentioned above, when regions having only a smear charge are placed under a gate connected to the terminal 210, at intervals of a period required for transferring an electric charge by four stages of vertical CCD, the smear charge is sent to the terminal 209 through a switching MOS transistor 209' connected to the terminal 208. Further, when signal charges from photodiodes in adjacent rows, for example, the signal charges $S_1$ and signal charges $S_2$ are transferred to the horizontal CCD's 300 and 300', respectively, the terminals 401 and 210 are put to a low potential level, and a pulse train 311 is applied, as the pulse signal $\phi_H$, to the terminal 203, to read out the signal charges $S_1$ and $S_2$ from the output terminals 205 and 205' in one horizontal effective scanning period (as shown in the j-th and k-th rows of FIG. 9). Similarly, the combination of the signal charges $S_3$ and signal charges $S_4$, the combination of the signal charges $S_5$ and signal charges $S_6$, and so on are transferred to the horizontal CCD's 300 and 300' at intervals of a period required for transferred an electric charge by eight stage (that is, $2\times(b_1+b_2+2)$ stages) of vertical CCD, to be delivered from the output terminals 205 and 205' at intervals of one horizontal period.

In order to perform the interlaced scanning of television signal, the combination of signal charges which are delivered simultaneously from the output terminals 205 and 205' in the second field, is made different from the combination of signal charges in the first field. That is, in the second field, the signal charges $S_2$ and signal charges $S_3$ are simultaneously delivered, and the signal charges $S_4$ and signal charges $S_5$ are simultaneously delivered. The switching circuit 221 of FIG. 8 is provided for changing over the connection of the output terminals 205 and 205' to the succeeding stage, since signal charges of photodiodes in an odd-numbered row are delivered from the output terminal 205 in the first field, and delivered from the output terminal 205' in the second field.

By carrying out the above driving method, the present embodiment having substantially the same light receiving part as in the conventional device of FIG. 1 can deliver signal charges of all picture elements separately from each other at every field. Specifically, when a single chip color imaging device is formed of the present embodiment, the reduction of resolution can be prevented, and a Moiré pattern can be decreased. Further, since electric charges can be transferred in each vertical CCD at high speed, the amount of smear can be reduced by a factor of $2/(b_1+b_2+2)$, and the dynamic range of each vertical CCD is approximately doubled.

In the above, explanation has been made on a case where the numerical values $b_1$ and $b_2$ are both made equal to 1 (one). In a case where $b_1$ and $b_2$ are made equal to zero, however, a region capable of holding only a smear signal (that is, a region which is designated by the reference mark X in FIGS. 4 to 6) is not present, and therefore it is not required to remove smear charges through the switching MOS transistors 209', which are connected to the terminal 208. Accordingly, if the present embodiment is used only in a manner that $b_1$ and $b_2$ are both made equal to zero, the switching MOS transistors 209' connected to the terminal 208 as well as the wiring conductor connected to the terminal 209 may be removed.

Figure 10:
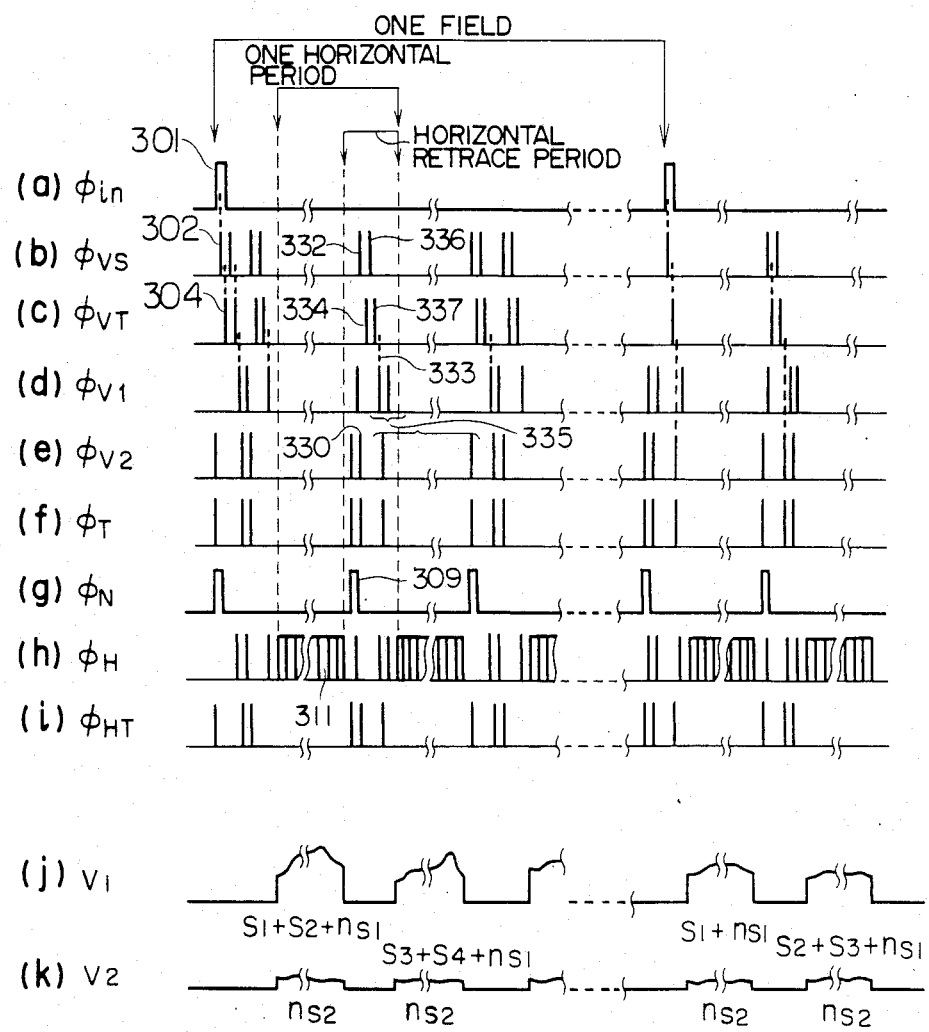
FIGS. 10, 12 and 13 are a time chart and schematic diagrams for explaining other methods of driving the embodiment of FIG. 7A.
Figure 11:
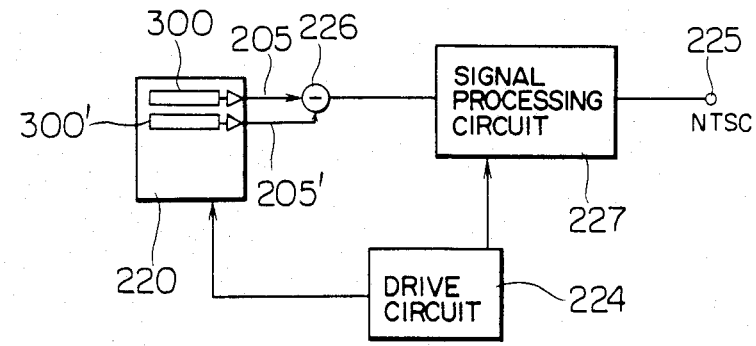
FIGS. 11 and 14 are block diagrams showing other examples of a signal processing circuit used in the embodiment of FIG. 7A.
Figure 12:
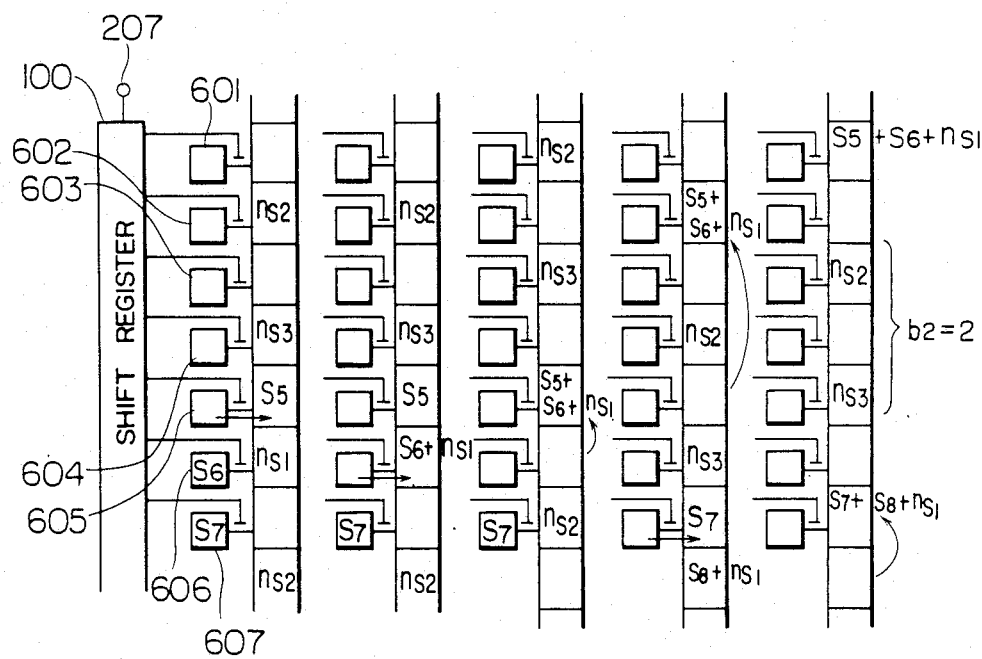

FIGS. 10 and 11 show another method of driving the embodiment of FIG. 7A and a signal processing circuit used in this driving method, respectively. In this driving method, not only the sum of signal charges from a pair of photodiodes in adjacent rows is read out as in the conventional device of FIG. 1 but also only a smear charge is read out, to subtract the smear charge from the sum of signal charges. Thus, the amount of smear can be reduced. FIG. 12 schematically shows this driving method. In this driving method, the pulse 301 of the input pulse signal $\phi_{Vin}$ and the pulse 302 of the drive pulse signal $\phi_{VS}$ are first applied to the vertical shift register 100 as in FIG. 9, to put the switching MOS transistor 231 in the ON-state. Then, the pulse 304 of the control pulse signal $\phi_{VT}$ is applied to the terminal 212, to transfer the signal charges $S_1$ from the photodiodes in the first row to the vertical CCD's 101 to 10N. FIG. 12 shows a process for transferring signal charges $S_5$ to $S_8$ from photodiodes 605 to 608 in the fifth to eighth rows to a vertical CCD. First, a pulse 330 of the transfer pulse signal $\phi_{V2}$ is applied to the terminal 202, to place regions having a signal charge or a smear charge at even-numbered stages. In FIG. 12, reference symbols $n_{S1}$ to $n_{S3}$ designate smear charges contained in regions, and the smear charges $n_{S1}$ to $n_{S3}$ are nearly equal in quantity to each other. For example, the amount of smear charge $n_{S1}$ which is mixed with a signal charge, is nearly equal to the amount of smear charge $n_{S2}$ which is contained in the next region. (The regions containing only one of the smear charges $n_{S1}$ to $n_{S3}$ correspond to regions which are designated by the mark X in FIG. 6.) After the pulse 330 of the pulse signal $\phi_{V2}$ has been applied to the terminal 202, the terminal 202 is returned to the low potential level. Thus, a region containing a signal charge is left at an even-numbered stage, and regions at odd-numbered stages are put in a state capable of temporarily holding an electric charge. In this state, the signal charges $S_5$ and $S_6$ are transferred to the vertical CCD by pulses 332 and 336 of the drive pulse signal $\phi_{VS}$ and pulses 334 and 337 of the control pulse signal $\phi_{VT}$. That is, as shown in parts (a) and (b) of FIG. 12, the signal charges $S_5$ and $S_6$ are temporarily stored in the fifth and sixth stages, respectively. Thereafter, a pulse 333 of the transfer pulse signal $\phi_{V1}$ is applied to the terminal 201. Thus, all of the signal charges and smear charges in even-numbered stages are transferred to odd-numbered stages, and therefore signal charges are present only in odd-numbered stages (as shown in part (c) of FIG. 12). Thereafter, electric charges in the vertical CCD are transferred upwardly by three stages, by pulses 335 of the transfer pulse signals $\phi_{V1}$ and $\phi_{V2}$. The above operation is repeated, to transfer the sum of the signal charges $S_7$ and $S_8$, the sum of signal charges $S_9$ and $S_{10}$, and so on, in the vertical CCD.

When the transfer pulse signals $\phi_{V1}$ and $\phi_{V2}$ are applied to the vertical CCD in a horizontal retrace period, the same signal as the transfer pulse signal $\phi_{V2}$ is used as the pulse signals $\phi_T$ and $\phi_{HT}$, and the same signal as the transfer pulse signal $\phi_{V1}$ is used as the pulse signal $\phi_H$. Thus, a sum charge $S_1+S_2+n_{S1}$ and the smear charge $n_{S2}$ are transferred to the horizontal CCD's 300 and 300', respectively, and then are read out from the output terminals 205 and 205' in a horizontal effective scanning period by the pulse train 311 of the pulse signal $\phi_H$ (as shown in the j-th and k-th rows of FIG. 10). Further, when the smear charge $n_{S3}$ is transferred to the coupling part and placed under a gate connected to the terminal 210, the switching MOS transistors 209' connected to the terminal 208 are put in the ON-state by a pulse 309 of the pulse signal $\phi_N$, and the smear charge $n_{S3}$ is delivered to the outside through the switching MOS transistor 209' and the terminal 209. The smear charge $n_{S1}$ contained in the sum charge $S_1+S_2+n_{S1}$ and the smear charge $n_{S2}$ cancel each other by a subtraction circuit 226 of FIG. 11. Thus, a video signal containing only a little smear component is sent to a signal processing circuit 227, and then delivered, as an NTSC signal, from the circuit 227. That is, a television signal is obtained which has only a little smear component. In order to perform the interlaced scanning, the combination of signal charges in the second field is made different from that in the first field. For instance, the sum of the signal charges $S_6$ and $S_7$ is delivered in the second field. Although FIGS. 10 and 12 show a case where the number $b_2$ of stages which contain only a smear charge and interposed between stages each having a signal charge, is equal to 2 (two), the numerical value $b_2$ may be an integer satisfying a relation $b_2 \geq 1$. Further, in the embodiment of FIG. 7A, s single horizontal CCD may be used in place of the horizontal CCD's 300 and 300', and all of the smear charges in stages which contain only a smear charge, may be delivered to the outside through the terminal 209. In this case, owing to an increase in transfer velocity of electric charge in each vertical CCD, the amount of smear is reduced only a factor of $1/(b_2+1)$, as compared with the conventional device of FIG. 1. (In the driving method of FIG. 10, owing to the operation of the subtraction circuit 226, the amount of smear is further reduced.) Further, when the switching MOS transistors 209' connected to the terminal 208 and the wiring conductor connected to the terminal 209 are removed from the embodiment of FIG. 7A, and when smear charges $n_{S2}$, $n_{S3}$, and so on in $b_2$ stages are read out from a horizontal CCD and one $b_2$-th of a resultant smear charge (namely, $n_{S2}+n_{S3}+ \ldots$) is subtracted from the sum charge $S_1+S_2+n_{S1}$, the same effect as in the driving method of FIG. 10 is obtained.

Figure 13:
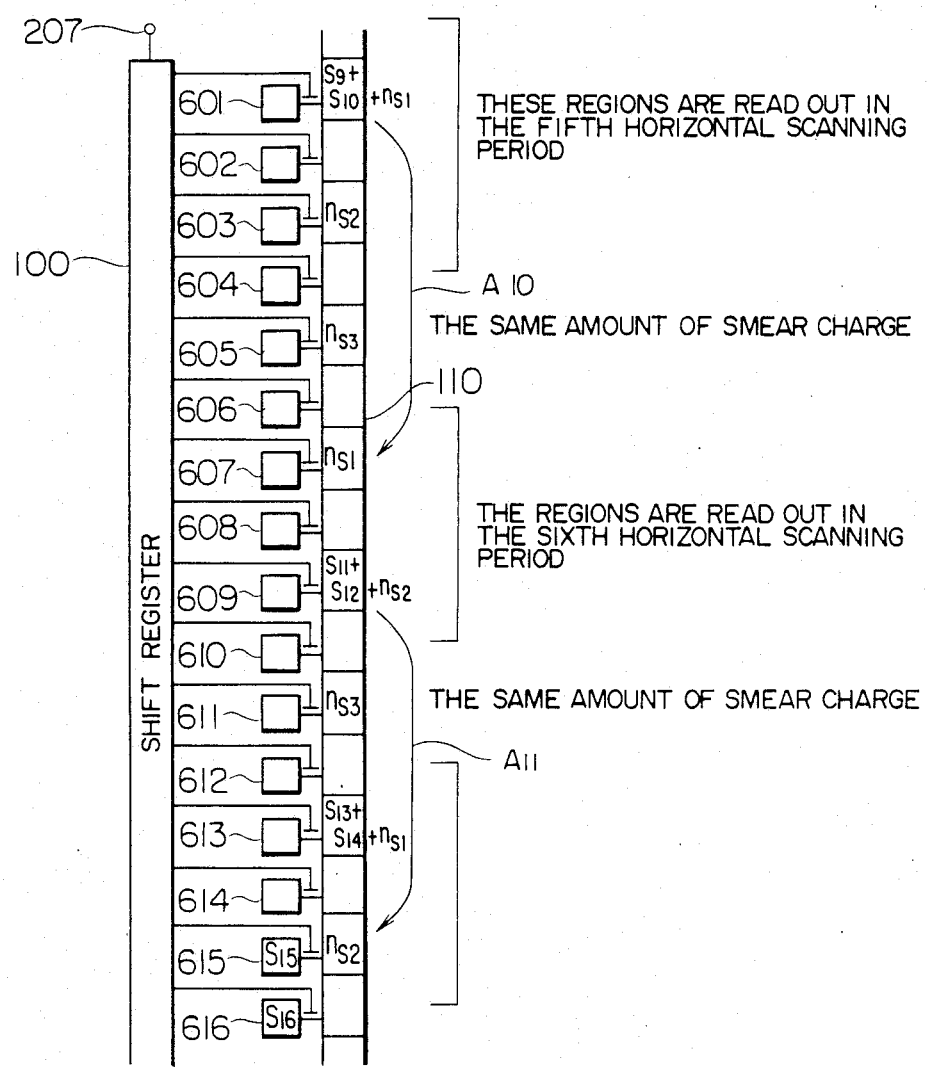
Figure 14:
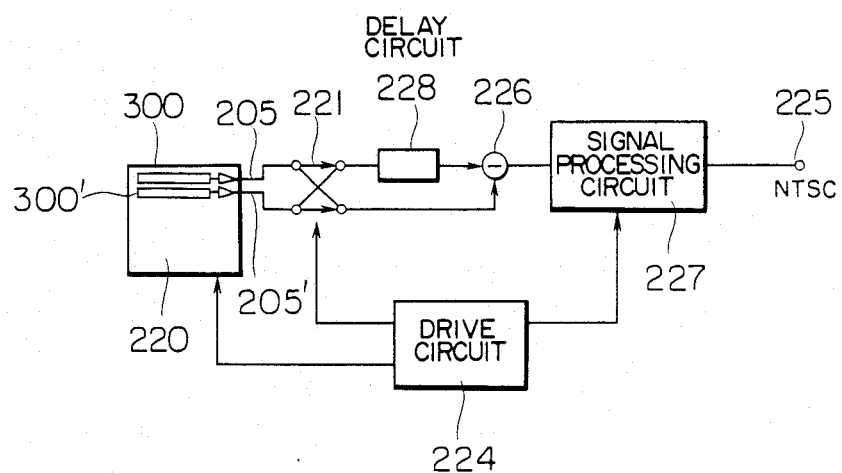

FIGS. 13 and 14 are a schematic diagram showing a further method of driving the embodiment of FIG. 7A and a block diagram showing a signal processing circuit used in the above driving method, respectively. The driving method of FIG. 13 can further reduce the amount of smear, as compared with the driving method of FIG. 10, and a main difference between these driving methods resides in a manner in which signal charges are transferred to a vertical CCD. Unlike the driving method shown in FIGS. 10 and 12, according to the present driving method, signal charges are transferred to a vertical CCD, in such a manner that the number of stages which contain only smear charge and are interposed between two stages each having a signal charge, is made equal to $(b_2-1)$ and $(b_2+1)$ alternately, as shown in FIG. 13. Although signal charges in a horizontal CCD are read out in a horizontal scanning period, each vertical CCD is kept undriven during the horizontal scanning period which is far longer than a horizontal retrace period for driving each vertical CCD. In other words, signal charges in each vertical CCD are not transferred but are kept, for example, at a state shown in part (c) of FIG. 12, in the horizontal scanning period. Accordingly, the amount of smear charge which leaks in a vertical CCD, is dependent upon the position in the vertical CCD. Thus, the amount of smear charge $n_{S1}$ is different from the amount of smear charge $n_{S2}$. According to the driving method of FIG. 13, a smear charge equal to the smear charge $n_{S1}$ contained in a sum charge $S_9+S_{10}+n_{S1}$ appears in a region which is six stages (namely, $2(b_2+1)$ stages) lower than a region having the above sum charge (as indicated by an arrow A10 in FIG. 13), and is read out from the horizontal CCD 300 when one horizontal period has elapsed after the sum charge $S_9+S_{10}+n_{S1}$ was read out from the horizontal CCD 300. Further, a smear charge equal to the smear charge $n_{S2}$ contained in a sum charge $S_{11}+S_{12}+n_{S2}$ appears in a region which is six stages lower than a region having the sum charge $S_{11}+S_{12}+n_{S2}$ (as indicated by an arrow A11 in FIG. 13), and is read out from the horizontal CCD 300' when one horizontal period has elapsed after the sum charge $S_{11}+S_{12}+n_{S2}$ was read out from the horizontal CCD 300'. An output signal corresponding to a sum signal and a smear signal corresponding to only a smear signal are sent from the output terminal 205 or 205' to the switching circuit 221 which is controlled by the drive circuit 224, as shown in FIG. 14. The output signal and smear signal delivered from one of the output terminals 205 and 205' are separated from each other by changing the internal connection of the switching circuit 221 at intervals of one horizontal period. The output signal separated from the smear signal is applied to a delay circuit which can delay the input thereof by one horizontal period, and then applied to the subtraction circuit 226, to remove a smear component from the output signal. The output of the subtraction circuit 226 is applied to the signal processing circuit 227, and thus a television signal having no smear component is delivered from the terminal 225. In the driving method of FIG. 13, a smear charge equal to the smear charge contained in a sum charge is subtracted from the sum charge. Accordingly, the driving method of FIG. 13 is far superior in capability of removing smears to the driving method of FIG. 10.

Figure 15:
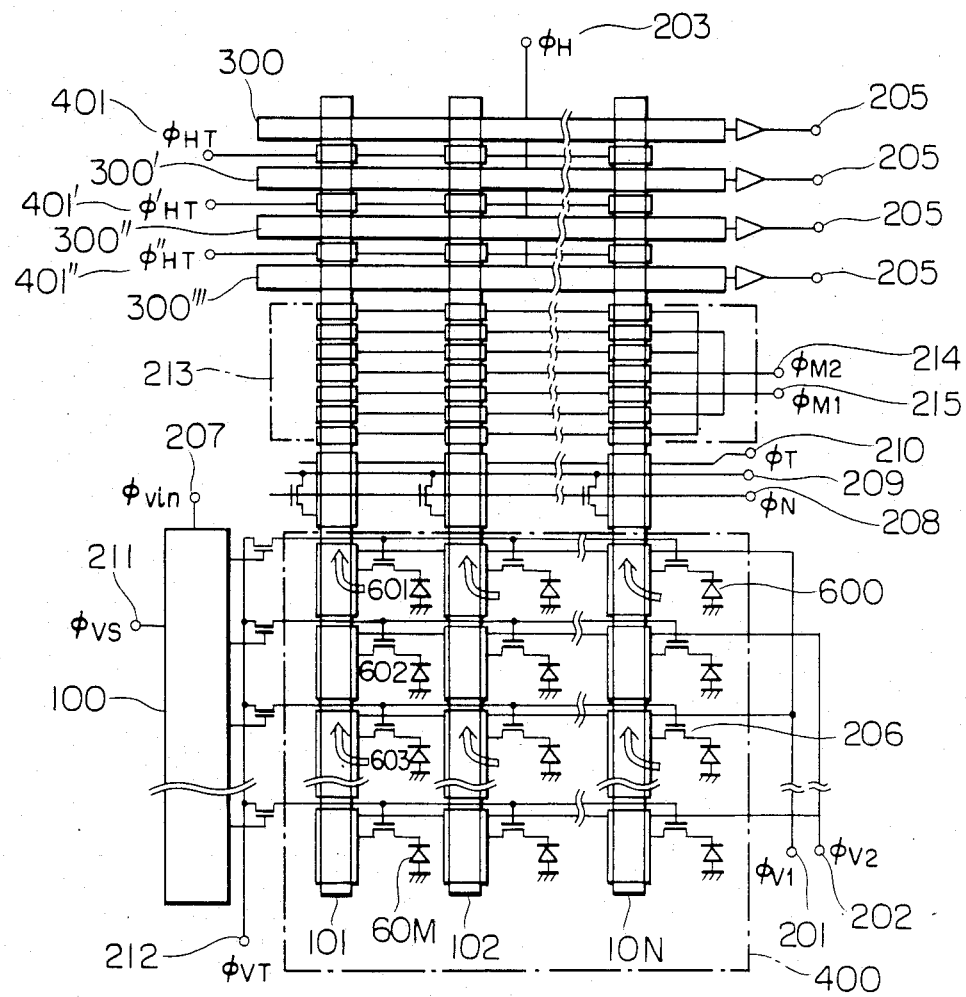
FIGS. 15 and 16 are schematic diagrams showing other embodiments of a solid state imaging device according to the present invention.

In order to read out signal charges of photodiodes in adjacent rows independently of each other and to read out only a smear charge, it is required to replace the horizontal CCD's 300 and 300' of FIG. 7A by three or four horizontal CCD's. Further, as shown in FIG. 15, a charge storage part 213 which is driven by pulse signals $\phi_{M1}$ and $\phi_{M2}$ applied to terminals 214 and 215 and can store signal and smear charges corresponding to one horizontal period, may be provided between the coupling part and the horizontal CCD's, to make it possible to drive each vertical CCD even in the horizontal effective scanning period.

Figure 16:
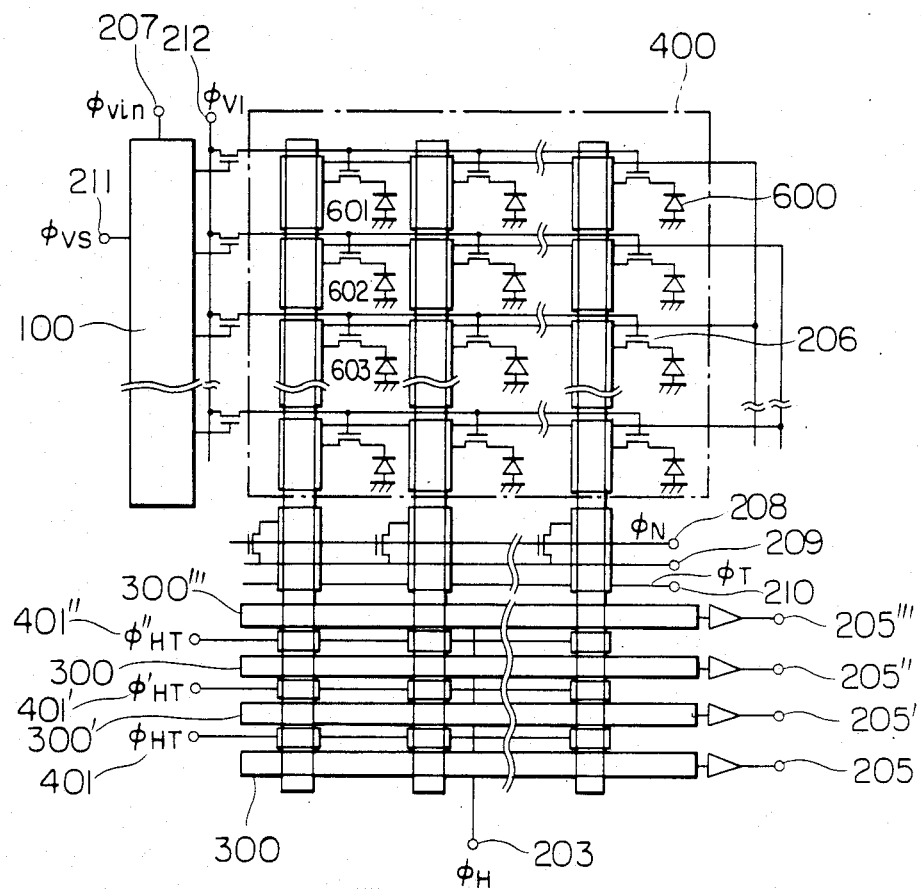

In the foregoing explanation, the driving methods similar to the driving method shown in part (a) of FIG. 6 have been used for the embodiment of FIG. 7A and modified versions thereof. However, as shown in FIG. 16, horizontal CCD's 300 to 300''' may be placed below the light receiving part 400. Alternatively, the horizontal CCD's 300 and 300' may be placed below the light receiving part 400. In these cases, a driving method similar to that shown in part (b) of FIG. 6 can be carried out.

Further, each horizontal CCD is not always required to be driven by a two-phase signal, but may be driven by a three-phase signal as disclosed in a Japanese utility model application specification (Laid-open No. sho 57-100361), to reduce the number of horizontal CCD's used.

In the foregoing, explanation has been made only on two-dimensional solid state imaging devices. However, the CCD driving methods shown in parts (a) and (b) of FIG. 6 are applicable to a one-dimensional solid state imaging device.

Meanwhile, although the term "vertical" and "horizontal" are used in a conventional meaning, they are not strict in the meaning. For example, horizontal and vertical directions can be exchanged. They only represent two non-parallel directions.

We claim:

1. A solid state imaging device formed in a semiconductor substrate, comprising:
a plurality of photoelectric conversion elements formed in a surface of said semiconductor substrate for storing photoexcited charge carriers, and arranged regularly in a twodimensional matrix of rows and columns respectively aligned parallel to horizontal and vertical directions;
a plurality of vertical charge transfer means for successively transferring charge carrier packets in the vertical direction, said vertical charge transfer means being respectively associated with the columns of said matrix;
a plurality of switching means respectively associated with said plurality of photoelectric conversion elements for controllably transferring the photoexcited charge stored in said photoelectric conversion elements to associated locations in said plurality of vertical charge transfer means;

at least one horizontal charge transfer means coupled to said plurality of vertical charge transfer means and including means for receiving the charge carriers from said plurality of vertical charge transfer means, for transferring said charge carrier packets in the horizontal direction and for outputting said charge carrier packets; and scanning means for successively driving said plurality of switching means in the vertical direction so as to successively transfer the charge carriers in the photoelectric conversion elements to the associated vertical charge transfer means at such timing that the charge carrier packets from the photoelectric conversion elements are separated with gaps and successively transferred in the vertical charge transfer means.

2. A solid state imaging device according to claim 1, wherein a wiring pattern for driving said plurality of switching means is formed in a layer which exists above a wiring pattern for driving said plurality of vertical charge transfer means.

3. A solid state imaging device according to claim 1, wherein at least two horizontal charge transfer means are provided.

4. A solid state imaging device according to claim 1, further comprising a switching transistor formed of an MOS field effect transistor disposed between said vertical charge transfer means and said horizontal charge transfer means for draining additional charge carriers disposed between said charge carrier packets which additional charge carriers correspond to noise.

5. A solid state imaging device formed in a semiconductor substrate, comprising:
   a plurality of photoelectric conversion elements formed in a surface of said semiconductor substrate for storing photoexcited charge carriers, and arranged regularly in a two-dimensional matrix of rows and columns respectively aligned parallel to horizontal and vertical directions;
   a plurality of vertical charge transfer means for successively transferring charge carrier packets in the vertical direction, said vertical charge transfer means being respectively associated with the columns of said matrix;
   a plurality of switching means respectively associated with said plurality of photoelectric conversion elements for controllably transferring the photoexcited charge carriers stored in said photoelectric conversion elements to associated locations in said plurality of vertical charge transfer means;
   at least one horizontal charge transfer means coupled to said plurality of vertical charge transfer means and including means for receiving the charge carriers from said plurality of vertical charge transfer means, for transferring said charge carrier packets in the horizontal direction and for outputting said charge carrier packets; and
   scanning means for successively driving said plurality of switching means in the vertical direction so as to successively transfer the charge carriers in the photoelectric conversion elements to the associated vertical charge transfer means at such timing that the charge carrier packets from the photoelectric conversion elements are separated with gaps and successively transferred in the vertical charge transfer means, said method comprising the steps of:
specifying a row by said scanning means; and
transferring a charge carrier packet in each vertical charge transfer means by at least one stage in a period, during which said row is specified.

6. A driving method according to claim 5, wherein a charge carrier packet in each vertical charge transfer means is transferred in a direction from bottom to top, and said scanning means scans said plurality of switching means in a direction from top to bottom.

7. A driving method according to claim 5, wherein a charge carrier packet in each vertical charge transfer means is transferred in a direction from top to bottom, and said scanning means scans said plurality of switching means in a direction from top to bottom.

8. A driving method according to claim 5, wherein a charge carrier packet and additional charge carriers that are disposed between said charge carrier packets and which correspond to noise are transferred in each vertical charge transfer means separately from each other.

9. A driving method according to claim 8, wherein said scanning means scans said plurality of switching means in such a manner that switching means in two adjacent rows parallel to a horizontal direction can be simultaneously driven.

* * * * *